(No Model.)
J. LAIB.
SICKLE BAR FOR MOWING MACHINES.
No. 263,537. Patented Aug. 29, 1882.
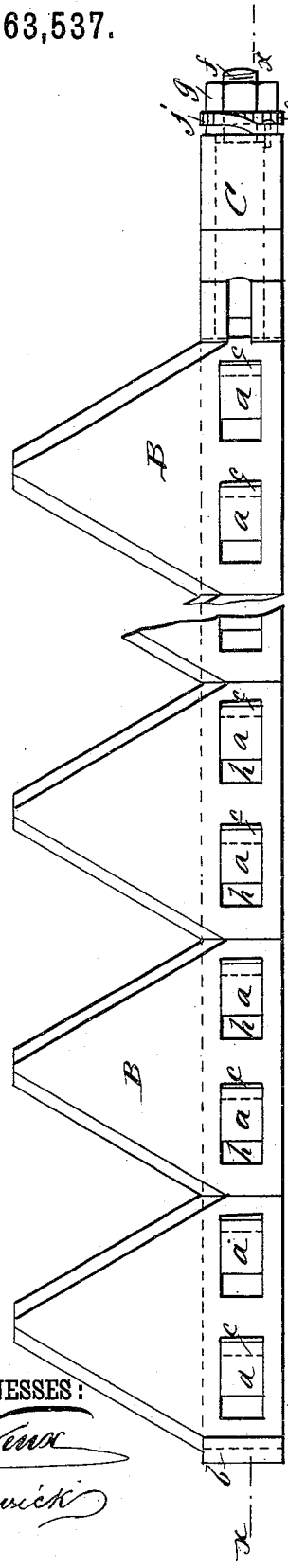
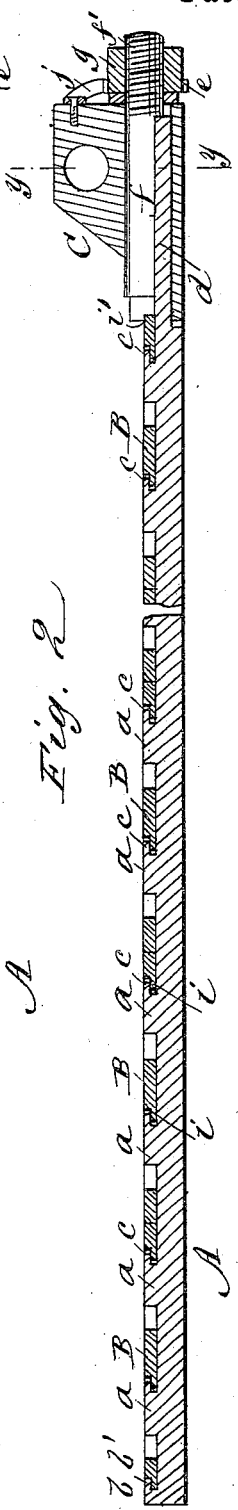
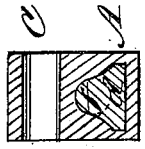
Fig. 3.
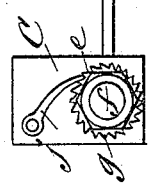
Fig. 4.
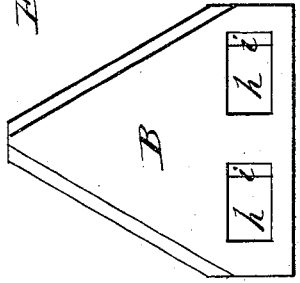
Fig. 5.
WITNESSES:
C. Nevenx
C. Sedgwick
INVENTOR:
J. Laib
BY
ATTORNEYS.

UNITED STATES PATENT OFFICE.

JOHN LAIB, OF KING'S STATION, INDIANA.

SICKLE-BAR FOR MOWING-MACHINES.

SPECIFICATION forming part of Letters Patent No. 263,537, dated August 29, 1882.

Application filed January 20, 1882. (No model.)

*To all whom it may concern:*

Be it known that I, JOHN LAIB, of King's Station, in the county of Gibson and State of Indiana, have invented a new and useful Improvement in Sickle-Bars for Mowing-Machines, of which the following is a full, clear, and exact description.

Reference is to be had to the accompanying drawings, forming part of this specification, in which similar letters of reference indicate corresponding parts in all the figures.

Figure 1 is a plan view of my improved sickle-bar. Fig. 2 is a sectional elevation of the same on line $x\,x$, Fig. 1. Fig. 3 is a plan view of one of the sections; Fig. 4, an end elevation of the sickle-bar; and Fig. 5 is a sectional elevation of the same, taken on the line $y\,y$ of Fig. 2.

The invention consists in a novel construction, arrangement, and combination of parts, as hereinafter fully described.

In the drawings, A represents the section-bar, B the cutting blades or sections, and C the eye-block. The section-bar is formed upon its upper side with the lugs $a$, which are undercut, as shown in Fig. 2, to form the lips $c$ for holding the sections C, which are formed with the corresponding openings, $h\,h$, and the lips $i\,i$. The outer end of the bar is formed with the flange $b$, which is also undercut, as shown, to form the lip $b'$ for the last section in the bar to come against for holding the section, and for closing the space between the last section and the bar to prevent clogging, and to prevent dirt working under the sections. The inner end of the section-bar is reduced in size, as shown at $d$, Figs. 2 and 5, and is formed with the rounded enlargement $f$ upon the upper side. This rounded enlargement extends past the reduced portion $d$ of the bar, and this extended portion is screw-threaded, as shown at $f'$, for the reception of the nut $g$. The eye-block C is formed with a passage through it to fit upon this reduced portion $d$ and the rounded enlargement $f$ thereof, and is adapted to be held and moved thereon by the said nut $g$, for tightening and holding the sections on the section-bar. The nut $g$ is formed with the ratchet $e$, and the eye-block is provided with the pawl $j$, which engages with the ratchet for holding the nut against all danger of loosening upon the extension $f$ from the jar of the machine. By this construction, in order to attach the sections to the section-bar, it is only necessary to place them upon the lugs $a$ and turn the nut $g$, which will force the eye-block backward and move all of the sections along upon the section-bar until the lips $i$ pass under the lips $c$, and are engaged and held by the lips $c$, as will be clearly understood. In order to remove the sections or any one of them from the bar, it is only necessary to loosen the nut and force forward the eye-block, which will permit the sections to be moved from under the lips of the lugs, and thus readily taken off.

The eye-block, being a separate piece from the section-bar, can be easily removed from the section-bar for repairs or for any other purpose, and when it becomes worn so as to interfere with the proper working of the machine it can be replaced with a new one at very small expense.

It will be seen that the lugs $a$ of the section-bar are made only the height of the thickness of the sections B, so that the section-bar may be of the same thickness as ordinary section-bars which have the sections secured by rivets, and hence it will have no more friction than ordinary section-bars, and can be substituted for them in the machines now in use. This advantage, together with the firmness with which the sections are held and the ease with which they may be removed from the section-bar, renders the cutting practical in every respect. The outer end of the eye-block is formed with the shallow gutter or groove $i'$, to fit over the edge of the first section on the section-bar for holding it in proper position, and for preventing all danger of any upward displacement of the section.

It will be seen from Fig. 2 that the sections do not come against the lugs under the lips $c$, but that the edges of the sections bind together in the section-bar when the eye-block is screwed up, so that all of the sections may be tightened by the eye-block, the lips $c$ serving only to prevent the upward movement of the sections.

Having thus fully described my invention, what I claim as new, and desire to secure by Letters Patent, is—

1. The combination, with the cutter-bar A, provided with the undercut lugs a and the flange b, having lip b', and the cutting-blades B, provided with rectangular openings h, having lips i, of the eye-block C, fitting upon the end of the cutter-bar, and provided with the groove i' and means for adjusting and securing the same upon the cutter-bar, substantially as and for the purpose set forth.

2. The combination, with the cutter-bar A, provided with the undercut lugs a, the lip b', the reduced and rounded and screw-threaded end d f f', and the cutting-blades B, provided with the rectangular openings h, having lips i, of the eye-block C, provided with the groove i' and the pawl j, and the ratchet-nut c g, substantially as and for the purpose set forth.

JOHN LAIB.

Witnesses:
 JOHN ARBUTHNOT,
 H. A. YEAGER.